United States Patent [19]
Arroyo

[11] Patent Number: 5,305,411
[45] Date of Patent: Apr. 19, 1994

[54] DIELECTRIC OPTICAL FIBER CABLES WHICH ARE MAGNETICALLY LOCATABLE

[75] Inventor: Candido J. Arroyo, Lithonia, Ga.

[73] Assignee: AT&T Bell Laboratories, Murray Hill, N.J.

[21] Appl. No.: 23,538

[22] Filed: Feb. 26, 1993

[51] Int. Cl.⁵ .................. G02B 6/00; G02B 6/44
[52] U.S. Cl. ........................... 385/109; 385/113
[58] Field of Search ............... 385/100, 105, 109, 113

[56] References Cited

U.S. PATENT DOCUMENTS

| | | | |
|---|---|---|---|
| 4,688,889 | 8/1987 | Pasini et al. | 385/109 X |
| 4,695,127 | 9/1987 | Ohlhaber et al. | 385/109 X |
| 4,701,014 | 10/1987 | Gartside et al. | 350/96.23 |
| 4,718,747 | 1/1988 | Bianchi et al. | 385/109 X |
| 4,725,122 | 2/1988 | Anelli et al. | 385/100 |
| 4,874,219 | 10/1989 | Arroyo et al. | 350/96.23 |
| 5,006,806 | 4/1991 | Rippingale et al. | 324/326 |
| 5,017,873 | 5/1991 | Rippingale et al. | 324/326 |

*Primary Examiner*—Akm E. Ullah
*Attorney, Agent, or Firm*—Donald E. Hayes, Jr.

[57] ABSTRACT

The present invention provides a dielectric optical fiber cable which is capable of being remotely detected while buried. Specifically, this invention incorporates magnetic materials into existing elements of high strength sheath systems which are commonly used to enhance the tensile properties of many optical fiber cables. Embodiments of the present invention include various configurations of strength member systems each comprising a plurality of longitudinally aligned glass roving or yarns which have neodymium iron boron compounded into an epoxy matrix.

9 Claims, 4 Drawing Sheets

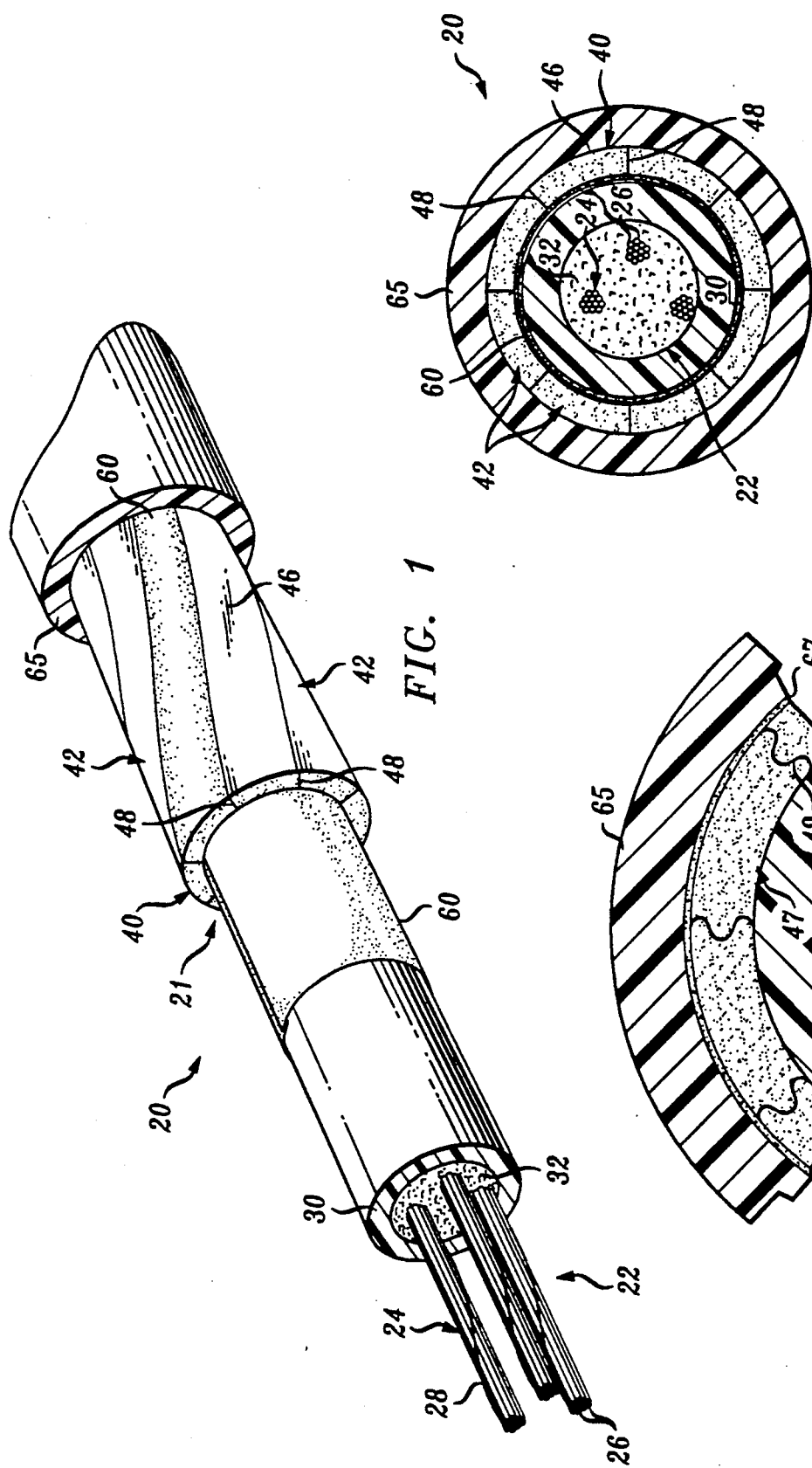

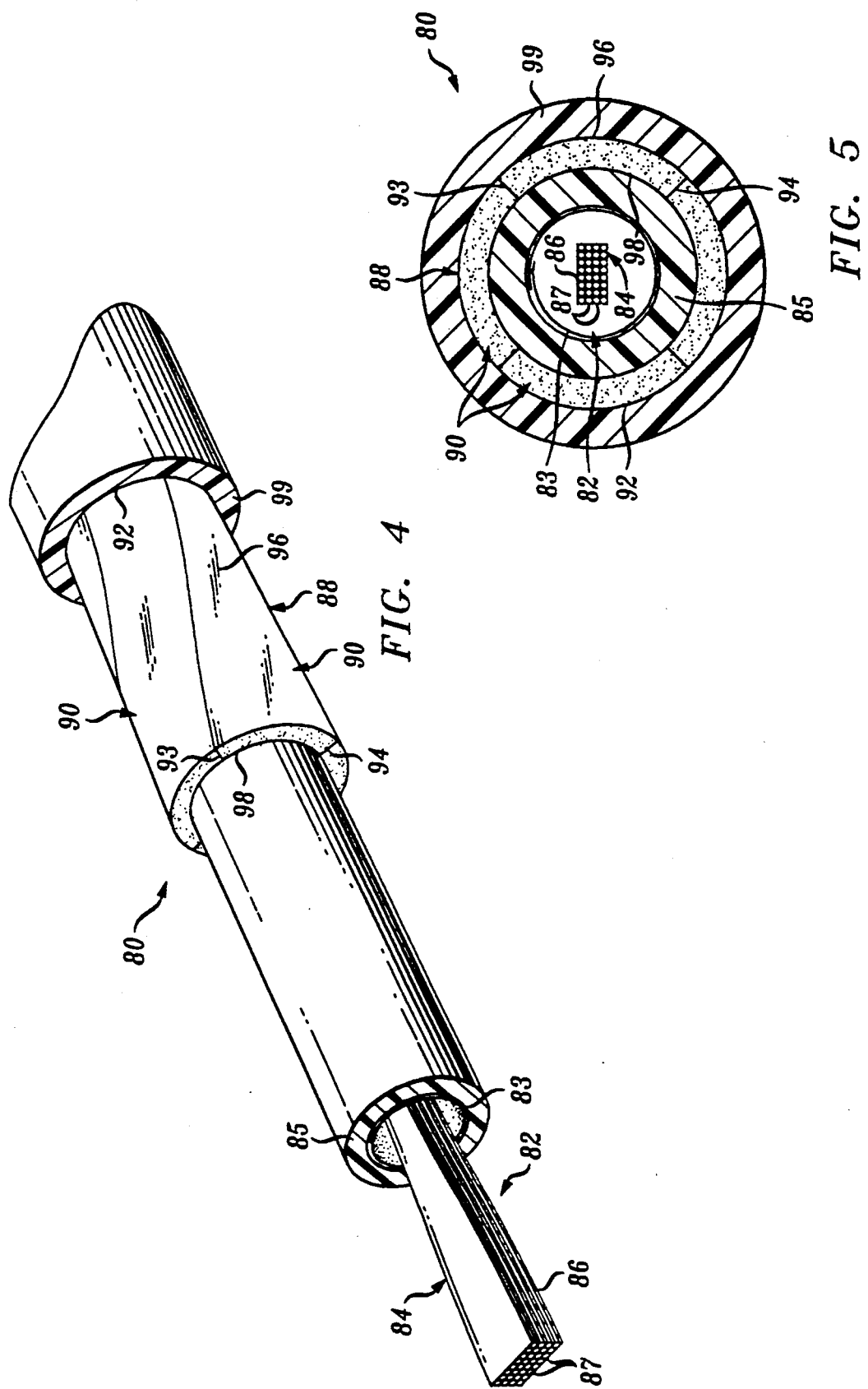

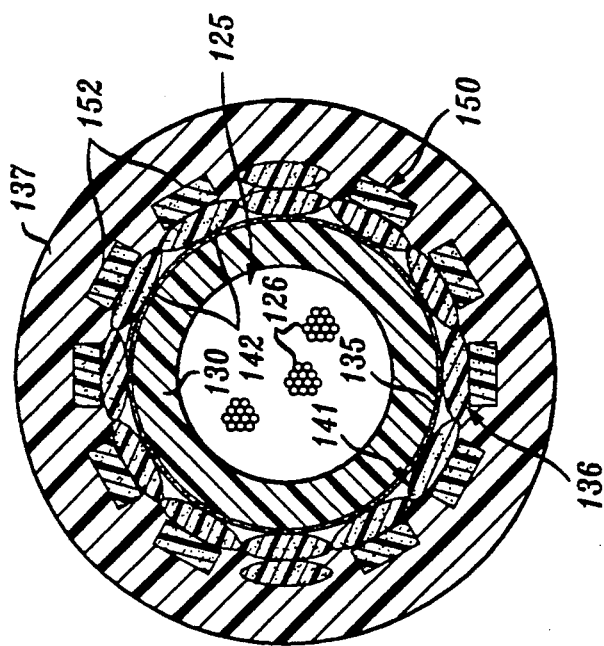
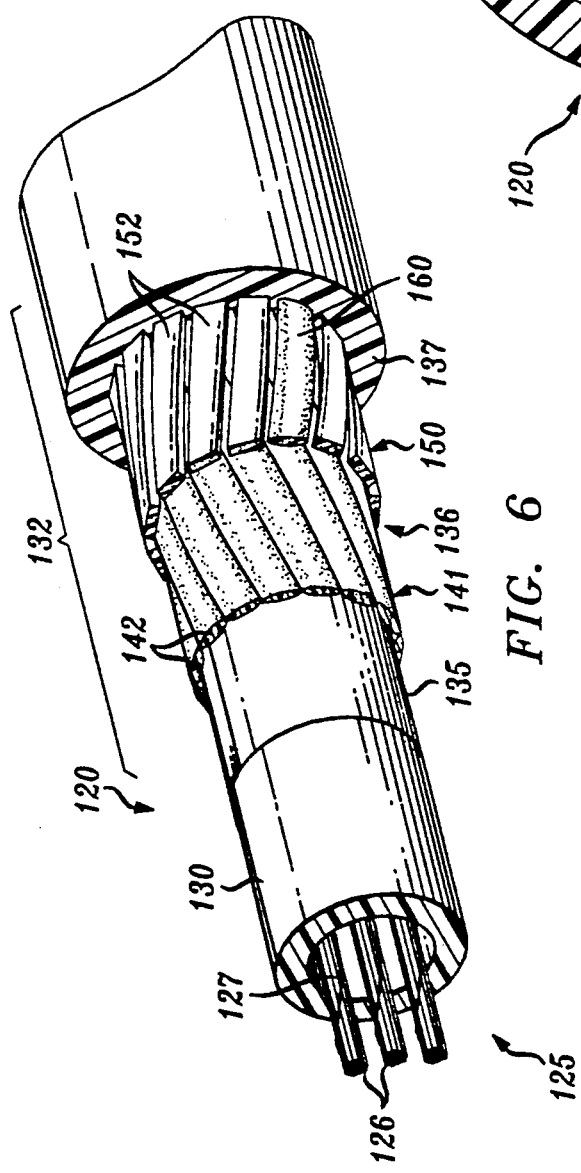
FIG. 7
FIG. 6

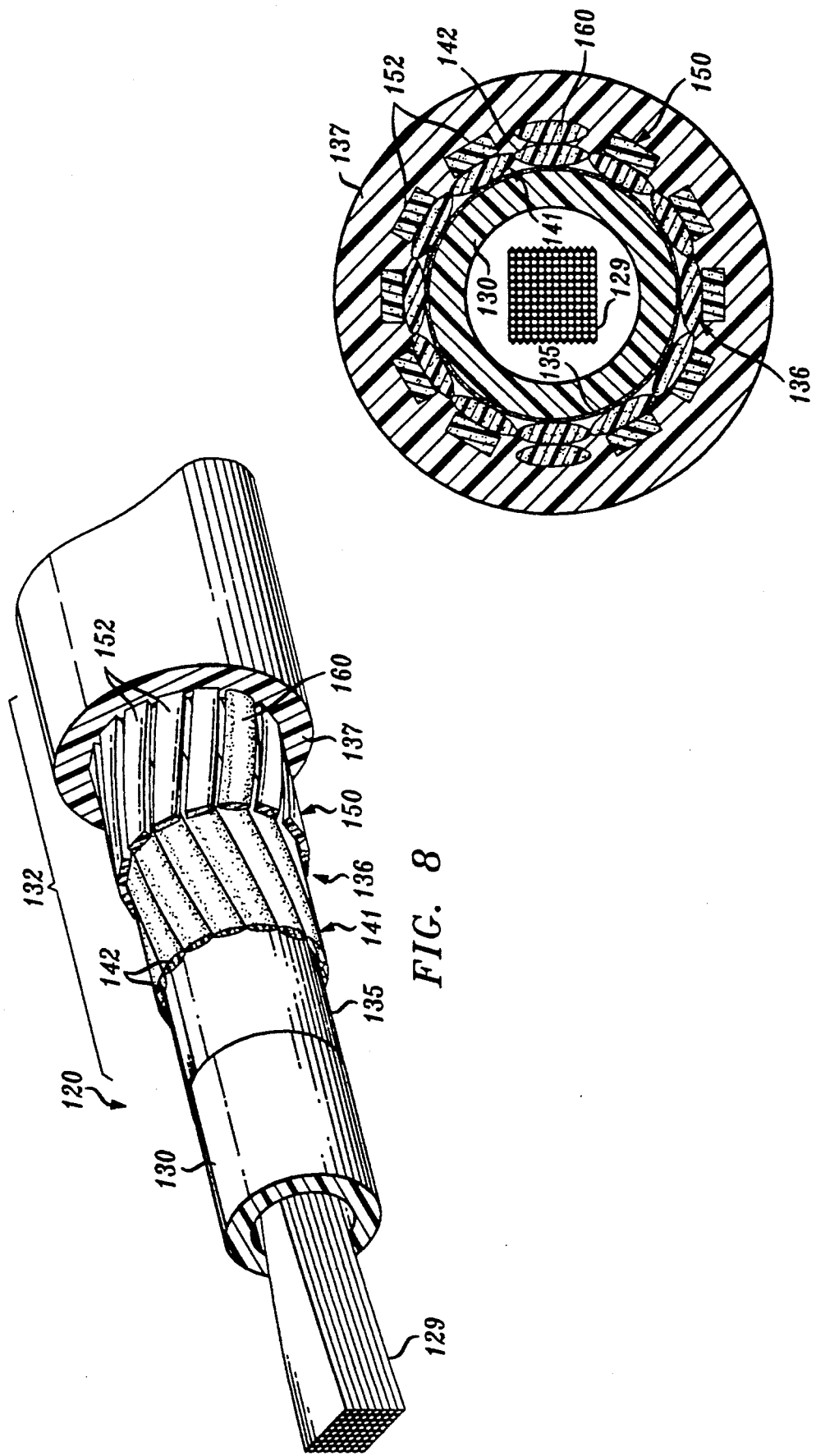

DIELECTRIC OPTICAL FIBER CABLES WHICH ARE MAGNETICALLY LOCATABLE

TECHNICAL FIELD

This invention relates to dielectric optical fiber cables which are magnetically locatable. More particularly, the cables incorporate magnetic particles into longitudinally extending strength members, thereby establishing a magnetically locatable cable.

BACKGROUND OF THE INVENTION

The two basic types of optical fiber cables presently used in the industry are metallic cables and dielectric (or non-metallic) cables. At present, it is believed that slightly less than one-third of telecommunication systems use dielectric fiber optic cable. However, approximately half of those using metallic cables have indicated through surveys that they would use dielectric cables instead if there existed a reliable and cost-effective method to locate the dielectric cable after it has been buried.

Presently, there are basically two general types of technologies involved in the detection of buried fiber optic cable, magnetic and metallic. In general, the existing magnetic locators consist of either 1) magnetic elements designed or embedded into the cable, or 2) a magnetic-field emitting product which is buried alongside the length of the cable. The residual magnetization generated by the past magnetic hysteresis of the cable may then be detected by a magnetic locator. However, the distribution pattern of the magnetic field often varies according to the cable and its particular position along the cable and thus, it is difficult to detect the correct cable when other magnetic members are located nearby.

Alternatively, existing metallic fiber optic cable locators generally use a detection method based on the electromagnetic field produced by the application of an alternating current to the metallic sheathed cable. However, the electric and/or magnetic field generated by the application of an AC electric signal to the cable is often not strong enough to allow a determination of the precise location of the cable. Such low levels of field strength are particularly ineffective in locating cables buried deep under the ground or sea bed.

Commonly, to facilitate detecting a dielectric cable, a copper ground wire is positioned just above the cable. However, the exposed nature of this ground wire makes it very vulnerable to lightning strikes. Furthermore, when a cable's armor or detection wire is severed by lightning or some other cause, it becomes impossible to apply an electric signal along the cable, thus creating great difficulty in locating and retrieving the cable for repair.

Other existing detection methods include incorporating a non-conductive tape which has been covered with a magnetic powder such as strontium or barium ferrite or compounding and extruding these magnetic powders in polyethylene or polyvinyl chloride conduits. Both of these methods employ a means of magnetizing a tape along its width, and helically wrapping it along the length of the cable or of the conduit. Each method also provides a distinctive electronic-detection signature which allows an operator to differentiate between a buried cable and a solid metallic pipe. See U.S. Pat. Nos. 5,006,806 and 5,017,873 which are assigned to Schondstedt Instrumentation Company of Reston, Va.

What is needed and seemingly not available in the prior art is a system which dependably, accurately and cost-effectively locates dielectric (non-metallic) buried cables. Also desirable is a system for locating buried dielectric cables which is readily adaptable to most, if not all, existing cable types.

One method involves modifying the existing waterblocking tape present in the cable so that the cable becomes magnetically locatable without adversely affecting the operational characteristics of the cable. See copending and commonly-assigned U.S. Ser. No. 08/012357 now allowed. However, while addressing a concern similar to that of the above-identified copending application, the present invention is directed toward modifying the strength member portion present in most communication cables instead of the waterblocking portion as taught by the application identified immediately above.

SUMMARY OF THE INVENTION

The foregoing problems of the prior art have been overcome with the cable of this invention. The present invention provides a dielectric optical fiber cable which is capable of being remotely detected while buried. Specifically, this invention incorporates magnetic materials into existing elements of high strength sheath systems which are commonly used to enhance the tensile properties of many optical fiber cables. Embodiments of the present invention include various configurations of strength member systems each comprising a plurality of longitudinally aligned glass roving or yarns which have been treated with epoxy compounded with neodymium iron boron.

BRIEF DESCRIPTION OF THE DRAWING

Other features of the present invention will be more readily understood from the following detailed description of specific embodiments thereof when read in conjunction with the accompanying drawings, in which:

FIG. 1 is a perspective view of a cable of this invention;

FIG. 2 is an end cross-sectional view of the cable of FIG. 1;

FIG. 3 is an enlarged view of a portion of interlocking shell segments in another embodiment of this invention;

FIG. 4 is a perspective view of an alternate embodiment of a cable of this invention;

FIG. 5 is an end cross-sectional view of the cable of FIG. 4;

FIG. 6 is a perspective view of an optical fiber cable of this invention;

FIG. 7 is an end view of the cable of FIG. 6;

FIG. 8 is a perspective view of another cable of this invention; and

FIG. 9 is an end view of the cable of FIG. 8.

DETAILED DESCRIPTION

Referring now to FIGS. 1 and 2, there is shown a cable which is designated generally by the numeral 20 and which is a cable having an all-dielectric sheath system 21. The structure is such that it provides excellent protection against rodent attacks and lightning.

As can be seen in FIGS. 1 and 2, the cable 20 includes a core 22 which comprises at least one transmission media. For example, the core 22 may comprise one or more units 24—24 each of which includes a plurality of optical fibers 26—26. Each of the units 24—24 is provided with a binder 28. The unit or units is disposed within a tubular member 30 which is made of a plastic material such as polyethylene, for example.

An inner diameter of the tubular member 30 is such as to control the ratio of the total cross-sectional area of the coated optical fibers within the core to the cross-sectional area defined by the inner surface of the wall of the tubular member. This allows the optical fiber unit or units sufficient movement during handling, installation and temperature cycling to avoid losses due to microbending.

Further, the tubular member, or core tube as it is often called, may be filled with a suitable water blocking material 32. Such a material may be one such as that disclosed and claimed in U.S. Pat. No. 4,701,016 which issued on Oct. 20, 1987 in the names of C. H. Gartside, III, et al. and which is incorporated by reference hereinto.

About the core tube is disposed a dielectric armor which is in the form of a shell and which is designated generally by the numeral 40. The shell 40 comprises a plurality of individual preformed segments 42—42. The segments 42—42 are such that they cooperate to provide a generally circular shell 40 for the core tube. Accordingly, each segment 42 is arcuately shaped and is disposed about the core tube such that a surface 46 thereof having the larger radius of curvature is oriented toward the outside of the cable.

Each of the segments 42—42 is made of a dielectric material such as organic or inorganic fibers embedded in a solid dielectric matrix material. In a preferred embodiment, each segment comprises glass fibers embedded in a cured epoxy matrix. However, the material from which the segments are made may be any one of a number of materials which are available commercially. What is important is that such material has relatively high tensile strength, relatively high compressive strength, is non-metallic and is a material which upon contact with the mouths of rodents discourages further attack. Such other materials include, for example, KEVLAR ® fiber material, S Glass, T Glass or carbon fiber material in an epoxy matrix.

In the preferred embodiment, glass rods available commercially from the Air Logistics Corp. under the designation E-glass are used. Each shell segment 42 comprises a substrate which includes as many as 4000 continuous unidirectional fiber glass filaments bonded together in an epoxy material matrix. This causes the substrate to become relatively stiff and is rendered capable of withstanding expected compressive as well as tensile stresses. Expected compressive stresses include those which are induced by thermal cycling, and initial shrinkage of the jacket material, for example. In the preferred embodiment, each shell segment 42 is characterized by a tensile stiffness of about 131 kg per one percent strain.

The present invention identifies and utilizes three basic parameters which collectively establish the effectiveness of magnetic cable-locating systems. Generally, magnetic detection depends on the following: 1) selecting the proper magnetic material (permanent or soft magnet), 2) determining the optimum magnetic marking or orientation on the cable (magnetize the tape along its width, thickness or length), and 3) selecting a reliable detection device. More specifically, the present invention utilizes these parameters to select and orient particular magnetic materials to optimize their adaptability with existing high strength elements commonly used in the sheath system of communication cables.

With regard to the first parameter involving the selection of the most appropriate type of magnetic material, the distinguishing operational factors of both permanent magnetic materials and soft magnetic materials should be compared. In general, permanent magnets are passive devices in which electromagnetic energy has initially been stored by a large aligning magnetic field. Therefore, permanent magnets are the preferred type of magnetic material for use within a communications cable since they require no externally applied current or force to maintain their magnetic characteristics.

However, it should be noted that while permanent magnetic materials are used in the preferred embodiment, soft magnetic materials may be used in accordance with the present invention within applications where the soft magnetic materials may be conveniently magnetized, such as through induction, in the presence of a stronger field of detection. Nickel zinc ferrite is a soft magnetic material commonly used throughout industry.

The second factor relates to the selection of the most appropriate marking or orientation of the magnetic materials. It is known to orient magnetic materials both along the width and length of a substrate. The preferred embodiment of the present invention is to orient the magnetic materials lengthwise along the individual strength element since tests have indicated such orientation produces the best results. However, orienting the magnetic materials along the width of the strength element may also be acceptable in accordance with the present invention.

While a third factor identifies the detection unit as an important point of concern for the overall detection system, it should be noted that any well known detection unit may be used in accordance with the present invention.

In accordance with the present invention, three particular permanent magnetic powders have been tested and identified as being readily applicable to existing epoxy-glass roving strength members to provide a dielectric cable which is both magnetically locatable and yet maintains adequate tensile strength properties. Specifically, neodymium iron boron, as well as strontium and barium ferrite, are acceptable as the permanent magnet materials of this invention. In the preferred embodiment of the present invention, neodymium iron boron is used as the magnetic material due to the much higher energy it produces. At present, strontium and barium ferrite powders may be obtained from the D. M. Steward Manufacturing Company of Chattanooga, Tenn. The neodymium iron boron powder may be obtained from Magnaquench Delco Remy, a division of General Motors of Anderson, Ind. Specification for each of these powders are readily available from the appropriate manufacturer.

As stated earlier, the magnetic material should be oriented along the length of the cable such that the magnetic field signature generated by the cable is readily distinguishable from that of a solid magnetic pipe. In order to achieve this, the magnetic material 60 of the preferred embodiment is compounded into an epoxy matrix covering at least one of the strength segments 42—42. Such treatment of a segment 42—42 provides at least one continuous longitudinal strip of the magnetic material 60 along the entire length of the cable. To achieve the desired detection signal, the treated high strength element may be positioned within the cable such that the strip of magnetic material 60 helically encircles the cable core 32.

While the present invention depicts treating at least one high strength segment by compounding the magnetically-locatable material into an epoxy matrix, it should be noted that any other well known and accepted manner of applying the magnetic material to the segments is believed to be within the scope of the present invention.

In addition to the previously described requirements, the shell 40 must be such that it does not impair the flexibility of the cable. For a cable which has a non-metallic sheath system and which is plowed into the ground in a burried installation, the cable must be capable of experiencing a bend radius equal to or less than ten times the outer diameter of the cable without damaging the cable. Suitable flexibility is accomplished in two ways, first by causing the segments to be wrapped helically about the tubular member. Of course, the lay may be varied depending on cable size and use. Also, suitable flexibility is achieved by controlling the number of segments 42—42 in the shell 40.

Further, the segments are arranged so that longitudinally extending side edge surfaces 48—48 of each are contiguous to longitudinally extending side edge surfaces of adjacent segments. Each shell segment 42 is preformed to cause the longitudinal side surfaces 48—48 thereof to extend along radial lines from a longitudinal axis of the cable when the shell segment is disposed about the core. In one embodiment, the segments 42—42 may be bound with a binder (not shown) which is wrapped helically about the shell, although this is not necessary to hold the segments together. It is within the scope of this invention to include shell segments 47—47 (see FIG. 3) which interlock along longitudinal edge surfaces 49—49 thereof and which have a tongue and groove configuration, for example. This helps to prevent ingress of moisture through the sheath system and into the core and helps to bring the shell segments into alignment during their assembly in a manufacturing process. More specific details regarding this particular cable configuration may be found in U.S. Pat. No. 4,874,219 which is expressly incorporated by reference herein.

The shell 40 may comprise any number of segments 42—42 as long as each covers less than one-half the periphery of the core. In a preferred embodiment, eight segments 42—42 are used. It has been found that the larger the number of segments, the more flexible is the cable. However, too many segments will impede the alignment of the segments during their assembly about the core to form the shell 30. Also, inasmuch as seams between the shell segments may be most susceptible to rodent penetration, an unnecessary increase in the number of segments may increase the vulnerability of the cable to rodent damage.

The sheath system of the cable 20 also includes an outer jacket 65. The outer jacket 65 may be made of a plastic material such as polyethylene and, for a cable which includes three units 24—24 of twelve optical fibers each, has an outer diameter of about 1.24 cm.

In the preferred embodiment, the jacket 65 is decoupled from the shell segments. However, it is within the scope of this invention to cause the shell segments to be bonded to an inner surface of the outer jacket. For example, as seen in FIG. 3, an outer surface of each segment 47 is provided with a coating 67 of a suitable adhesive material which will cause the jacket 65 to bond to the shell.

Advantageously, the shell 40 of this invention also acts as a thermal barrier. As the jacket is extruded over the shell 40, heat is available for transfer into the core. The segments 42—42 of the cable 20 insulate the core against the heat caused by the extrusion of the jacket. In fact, the shell segments obviate the need for a separate, well-known thermal core wrap about the core tube 30.

In another embodiment which is shown in FIGS. 4 and 5, a cable 80 includes a core 82 comprising transmission media 84 and a core tube 85. The transmission media 84 may be enclosed with a core wrap 83 disposed between the media and the core tube 85. The core wrap 83 protects the media 84 during the extrusion of the core tube 85. In this embodiment, the transmission media 84 may include a plurality of stacked ribbons 86—86. Each ribbon 86 includes a planar array of optical fibers 87—87. Enclosing the core tube 85 is a shell 88 comprising a plurality of arcuately shaped segments 90—90. In this embodiment, the shell 88 comprises four segments 90—90.

In the embodiment of FIGS. 4 and 5, each of the shell segments 90—90 is provided with a coating 92 of a superabsorbent material. The superabsorbent material may be one which is used to impregnate the carrier tape 60. Care must be taken to insure that longitudinal side edge surfaces 93 and 94 of each shell as well as major surfaces 96 and 98 are provided with the coating material. Such placement of the coating material and the arrangement of the shell segments with adjacent longitudinal edge surfaces being substantially contiguous will insure that the flow of water through the joints created between adjoining segments will be blocked.

Over the shell 88 is disposed a jacket 99. As in the earlier described embodiment, the jacket 99 may be a plastic material such as polyethylene.

The above-described cable is a cable having an all-dielectric sheath system which is attractive from many standpoints. Being all-dielectric it certainly is suitable for use in lightning-prone areas as it would not attract lightning. Also it is non-corrosive and helps to avoid the problem of hydrogen generation in optical fiber cables.

One of its most important features is its resistance to rodent attack. Being made of a material such as glass, it is not attractive to rodents as something to chew. The segments have great strength, are durable and discourage further attack by rodents after an initial encounter.

Referring now of FIGS. 6 and 7, there is shown an acceptable alternative embodiment of a cable in accordance with the present invention which is designated generally by the numeral 120. The cable 120 is suited for use as a riser cable in a building to connect between an optical termination closet in an entrance vault in a basement and a wiring closet in an upper floor.

The cable 120 includes a core 125 which includes a plurality of optical fiber units 126—126 each held together by a binder 127. Each unit comprises stranded or non-stranded optical fibers each of which typically comprises a coated optical fiber which may have a buffer coating of polyvinyl chloride (PVC), for example, thereover. The core 125 could just as well include a plurality of optical fiber ribbons 129—129 (see FIGS. 10 and 11). It should be understood that the cable 120 generally will have an outer diameter of about 0.5 inch or less. Although the invention is not limited to such a size cable, optical fiber cables at the present time do not generally exceed that diameter.

Surrounding the core 122 is a tubular member 130. Generally, the tubular member 130 is made of a fire-retardant plastic material such as PVC, for example.

The tubular member 130 is enclosed by a sheath system which is designated generally by the numeral 132. As can be seen in FIGS. 6-9, the sheath system 132 includes a core wrap 135 in the form of a tape, a strength member system 136 and a plastic outer jacket 137.

The core wrap 135 is non-metallic and comprises a fiberglass tape which has been impregnated with a material which enhances significantly the retardance of flame spread and smoke evolution. In such cables, suitable resistance to conductive and convective heat flow must be provided.

In a preferred embodiment, the tape is a woven fiberglass material which also provides strength for the cable 120. Non-woven material could be used for the core wrap tape but it is bulkier than the woven tape and its bulkiness is not needed to hold the impregnating material. Also, it has been found that the woven tape is easier to impregnate. The tape 135 is available commercially such as for example a TEMP-R-GLAS® tape available from the T & F Division of CHR Industries, Inc. The woven glass tape when impregnated with a material having a relatively low thermal conductivity exhibits unexpectedly superior flame and smoke retardant properties and a relatively high dielectric strength.

As with the previously discussed cable configurations, the magnetically locatable material may be applied to at least one of the strength members by any well known method. Element 160 is used herein to generally depict the individual strength member treated with the magnetic material.

The strength member system 136 must meet several criteria. First, it must have sufficient strength in compression to resist stresses induced by thermal cycling as well as bending and in tension to resist stresses induced by bending and by pulling. At least portions of the strength member system must be coupled sufficiently to the jacket so that the portions of that strength member system and the jacket provide a composite arrangement which resists buckling. Further, the cable must be relatively flexible, and the cross-sectional shape of the portions of the strength member system must not be overly large.

The strength member system 136 includes an inner first layer 141 (see FIGS. 6-9) of relatively flexible strength members 142—142 which are in engagement with the core wrap 135. Each of the strength members 142—142 comprises a glass fiber member such as a glass roving or yarn marketed by PPG Industries, for example, which is impregnated with a resinous material, for example. In a preferred embodiment, each of the strength members 142—142 is a glass roving and is wrapped helically about the core wrap tape 135. Each roving is characterized by a load carrying capability in tension of about 88 lbs. per one percent strain. The load per unit strain is defined as stiffness.

Another component of the strength member system 136 is an outer second layer 150 of strength members which are in engagement with the strength members 142—142 of the inner layer 140. As can be seen in the drawings, each of the majority of the strength members of the outer layer is designated 152 and comprises a relatively inflexible rod-like member which is made of glass fibers in the form of a yarn or roving. Such glass rods are available commercially from the Air Logistics Corp. under the designation E-glass tape. In the embodiment shown in FIGS. 6-9, the outer layer 150 also includes several of the strength members 142—142. For the preferred embodiment, the strength members 152—152 and 142—142 of the outer layer are wrapped helically about the strength members of the inner layer but in an opposite helical direction from those of the inner layer.

Although in the preferred embodiment, the strength member system includes two layers of helically wrapped strength members, other arrangements come within the invention. For example, the strength members of the cable 120 may be assembled to the cable without intended stranding.

Also, the strength members may be disposed in a single layer. This is particularly true in a ribbon core cable in which the outer diameter of the tubular member 130 is larger than for the cables of FIGS. 6 and 7, thereby allowing a greater number of strength members to be disposed about its circumference.

It is to be understood that the above-described arrangements are simply illustrative o fthe invention. Other arrangemnts may be devised by those skilled in the art which will embody the principles of the invention and fall within the spirit and scope thereof.

I claim:

1. An optical fiber cable, which includes:
   a core comprising at least one optical fiber transmission medium;
   a tubular member in which is disposed said core and which is made of a plastic material;
   a sheath system which is disposed about said tubular member and includes a plurality of longitudinally extending strength members wherein at least one of the strength members is treated with a magnetically locatable material and wherein the magnetically locatable material generates a detection signal which is distinguishable from that generated by a solid metallic pipe.

2. The cable of claim 1, wherein said magnetically locatable material is a powder.

3. The cable of claim 1, wherein said magnetically locatable material is selected from the group consisting of strontium ferrite, barium ferrite, and neodymium iron boron.

4. The cable of claim 1, wherein the magnetically-locatable material is disposed onto at least one of the longitudinally extending strength members which is helically wrapped about the tubular member.

5. The cable of claim 1, wherein the sheath system is made of a dielectric material.

6. The cable of claim 5, wherein the dielectric sheath system comprises at least eight longitudinally extending segments.

7. The cable of claim 1, wherein at least one of the longitudinally extending strength members comprises magnetically locatable material embedded in a cured epoxy matrix.

8. The cable of claim 7, wherein each of the strength members comprises resin bonded glass fibers.

9. The cable of claim 1, wherein the number of strength members is optimized to provide sufficient flexibility and so as not to impede the alignment of the members during manufacture of the cable.

* * * * *